United States Patent
Zhang et al.

(10) Patent No.: US 11,761,859 B2
(45) Date of Patent: Sep. 19, 2023

(54) METHOD FOR SELF-ADAPTION FASTER-THAN-REAL-TIME WORKING CONDITION START-UP STATE PREDICTION AND ESTIMATION OF UNIT

(71) Applicant: CSG POWER GENERATION CO., LTD., Guangzhou (CN)

(72) Inventors: Hao Zhang, Guangzhou (CN); Man Chen, Guangzhou (CN); Yu Gong, Guangzhou (CN); Yumin Peng, Guangzhou (CN); Xiong Dai, Guangzhou (CN); Mingxuan Yang, Guangzhou (CN); Xiaobo Qiu, Guangzhou (CN); Mingliang Yao, Guangzhou (CN); Yaxiong Yu, Guangzhou (CN); Jun She, Guangzhou (CN); Rufei He, Guangzhou (CN); Yanming Gao, Guangzhou (CN); Dehua Li, Guangzhou (CN); Xianbin Guo, Guangzhou (CN); Xiaoyi Wang, Guangzhou (CN)

(73) Assignee: CSG POWER GENERATION CO., LTD., Guangzhou (CN)

( * ) Notice: Subject to any disclaimer, the term of this patent is extended or adjusted under 35 U.S.C. 154(b) by 43 days.

(21) Appl. No.: 17/613,795

(22) PCT Filed: Sep. 30, 2020

(86) PCT No.: PCT/CN2020/119654
§ 371 (c)(1),
(2) Date: Nov. 23, 2021

(87) PCT Pub. No.: WO2021/238012
PCT Pub. Date: Dec. 2, 2021

(65) Prior Publication Data
US 2022/0326122 A1    Oct. 13, 2022

(30) Foreign Application Priority Data

May 26, 2020 (CN) .......................... 202010457316.9

(51) Int. Cl.
G06F 11/30 (2006.01)
G01M 99/00 (2011.01)
G08B 21/18 (2006.01)

(52) U.S. Cl.
CPC ......... *G01M 99/005* (2013.01); *G08B 21/182* (2013.01)

(58) Field of Classification Search
CPC .................................................. G01M 99/005
See application file for complete search history.

(56) References Cited

FOREIGN PATENT DOCUMENTS

| CN | 204697653 A | 6/2015 |
|---|---|---|
| CN | 104933295 A | 9/2015 |

(Continued)

OTHER PUBLICATIONS

International Search Report for Application No. PCT/CN2020/119654 dated Mar. 1, 2021, 4 pages.

(Continued)

*Primary Examiner* — Phuong Huynh
(74) *Attorney, Agent, or Firm* — Seyfarth Shaw LLP

(57) ABSTRACT

The present disclosure provides a self-adaption faster-than-real-time method for estimating a working condition start-up state of a unit. Firstly, an event recording sequence, an analog measurement point ID, an analog measurement point first-level alarm value and a history scatter point distribution record are read from a time sequence event record table, an analog measurement point table, an alarm threshold table and a historical scatter record table. A measured value slope of the analog measurement point is calculated according to an event recording relative time. Then, an abnormal state (Continued)

estimated value is calculated based on the history scatter point distribution record, the analog measurement point first-level alarm value and the measured value slope of the analog measurement point. Finally, a pre-warning is sent to remind a watchman to perform a preventive operation when the abnormal state estimated value is above the threshold.

9 Claims, 1 Drawing Sheet

(56) References Cited

FOREIGN PATENT DOCUMENTS

| CN | 204612758 U | 9/2015 |
|---|---|---|
| CN | 105045253 A | 11/2015 |
| CN | 106610617 A | 5/2017 |
| CN | 107165770 A | 9/2017 |
| CN | 110134079 | * 3/2019 |
| CN | 110045719 A | 7/2019 |
| CN | 110134079 A | 8/2019 |
| CN | 110412966 A | 11/2019 |
| CN | 110702437 A | 1/2020 |
| CN | 110727263 A | 1/2020 |
| CN | 110868334 A | 3/2020 |
| CN | 110939550 A | 3/2020 |
| KR | 1020180116808 A | 10/2018 |

OTHER PUBLICATIONS

Huo Juan et al., "A novel monitoring method of wind turbine generator real-time reliability based on tempeture signals," Mar. 2016, vol. 34 No. 3, 5 pages.

Chinese Office Action for corresponding Application No. 202010457316.9, dated Mar. 22, 2021, 8 pages.

* cited by examiner

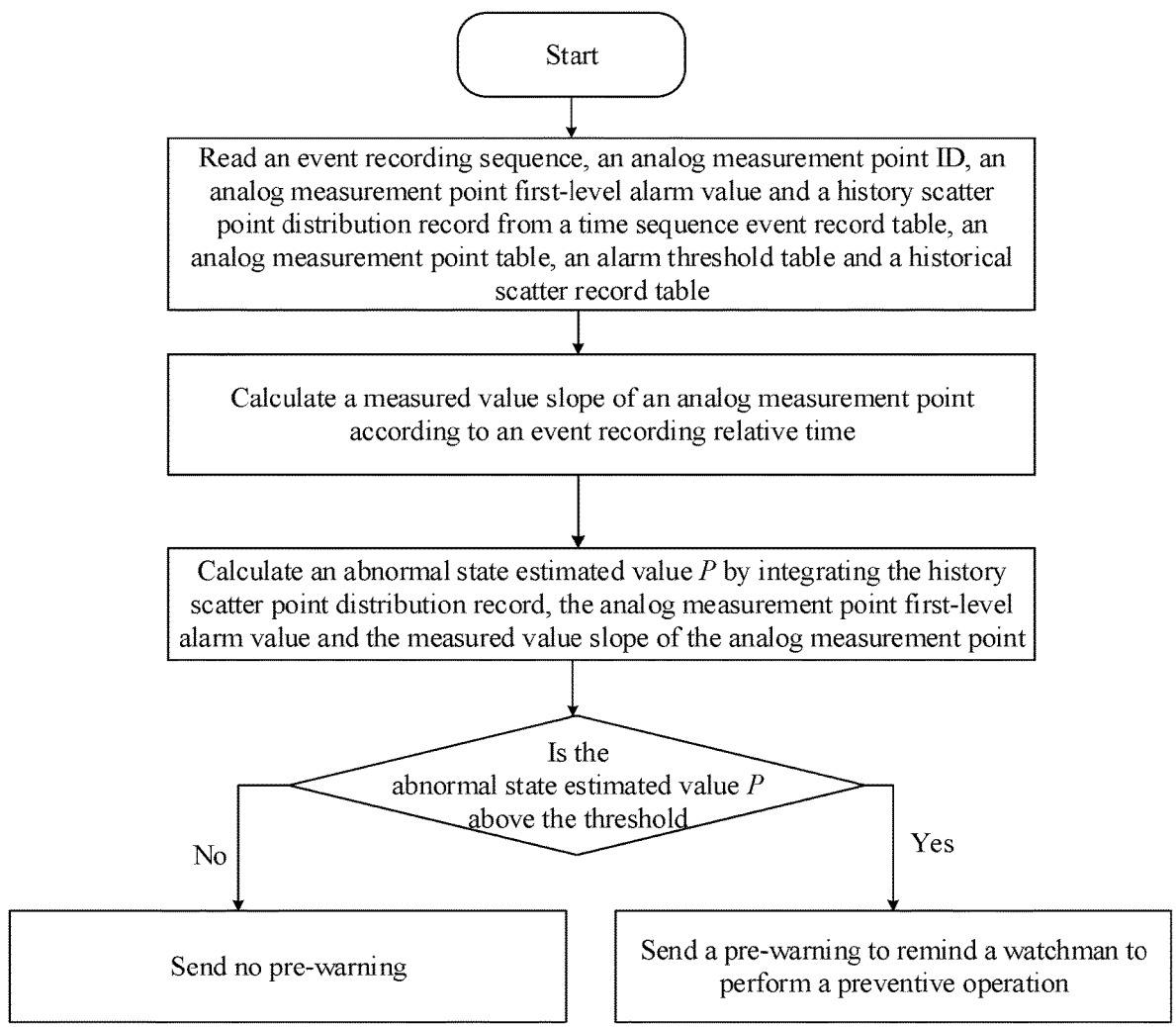

METHOD FOR SELF-ADAPTION FASTER-THAN-REAL-TIME WORKING CONDITION START-UP STATE PREDICTION AND ESTIMATION OF UNIT

CROSS REFERENCE TO RELATED APPLICATIONS

This is a U.S. National Stage application of, and claims priority to, PCT/CN2020/119654, filed Sep. 30, 2020, which further claims priority to Chinese Patent Application No. 202010457316.9, filed May 26, 2020, the disclosures of which are incorporated herein by reference in their entirety.

TECHNICAL FIELD

The present disclosure relates to the field of electrical equipment technologies, and in particular, to a method for self-adaption faster-than-real-time working condition start-up state prediction and estimation of a unit.

BACKGROUND

A power plant watchman is required to monitor more than 500 analog measurement points with a tripping outlet function to monitor a panel. The analog measurement points with the tripping outlet function are distributed in different simulation diagrams of an upper computer of a monitoring system. It is impossible to find an abnormality in advance by manually tracking a change trend by a watchman.

Although the monitoring system is provided with a gradient alarm, the gradient alarm can only find unstable instantaneous jump of measured values at analog measurement points. At present, due to the lack of a method for self-adaption faster-than-real-time working condition start-up state prediction and estimation of a unit for comprehensive time sequence actions, analog measured values and historical statistics, a power plant can only rely on the watchman to periodically review the simulation diagrams for state monitoring.

However, the watchman can find an abnormality only when the measured value at the analog measurement point reaches a first-level alarm value and a second-level alarm value. In this case, response time left for the watchman to judge and deal with is extremely short, the watchman often has no time to deal with it, and an outlet is tripped, which brings losses to power production.

SUMMARY

The present disclosure provides a method for self-adaption faster-than-real-time working condition start-up state prediction and estimation of a unit, which may calculate an measured value slope of the analog measurement point according to an event recording relative time, and then calculate an abnormal state estimated value based on history scatter point distribution records, an analog measurement point first-level alarm value and an measured value slope of the analog measurement point, to provide an effective method for a watchman to track a working condition start-up state change trend of an operating unit in super-real time and to identify hidden defects such as an abnormal rising trend and timeout of a start-up process step.

The present disclosure provides a method for self-adaption faster-than-real-time working condition start-up state prediction and estimation of a unit, including the following steps:

(1.1) reading an event recording sequence, an analog measurement point ID, an analog measurement point first-level alarm value and a history scatter point distribution record;

(1.2) calculating a measured value slope of an analog measurement point according to an event recording relative time;

(1.3) calculating an abnormal state estimated value P based on the history scatter point distribution record, the analog measurement point first-level alarm value and the measured value slope of the analog measurement point; and (1.4) sending no pre-warning when the abnormal state estimated value P is below a threshold; and sending a pre-warning to remind a watchman to perform a preventive operation when the abnormal state estimated value P is above the threshold.

In the method, the event recording sequence, the analog measurement point ID, the analog measurement point first-level alarm value and the history scatter point distribution record are respectively read from a time sequence event record table, an analog measurement point table, an alarm threshold table and a historical scatter record table correspondingly, and content recorded in the time sequence event record table includes a switching value signal set K with a serial number and a state which are set in sequence, the switching value signal set K including at least a unit start-up command signal and a unit steady-state signal; content recorded in the analog measurement point table includes a to-be-monitored analog measurement point set M; content recorded in the alarm threshold table includes an analog measurement point first-level alarm set $B_1$ and an analog measurement point second-level alarm set $B_2$; and content recorded in the historical scatter record table includes measured value distribution statistics and measured value slope distribution statistics of the analog measurement point corresponding to the switching value signal set K under a relative process.

In the method, the event recording relative time is a time difference $\Delta T_i([\Delta T_1, \Delta T_2, \ldots, \Delta T_{n-1}] \in \Delta T)$ obtained by subtracting two adjacent time records in time records $T_i([T_1, T_2, \ldots, T_n] \in T)$ of each switching value $K_i([K_1, K_2, \ldots, K_n] \in K)$ in the switching value signal set K; and the measured value slope of the analog measurement point $X_i([X_1, X_2, \ldots, X_n] \in X)$ is a quotient of a measured value difference $\Delta C_i([\Delta C_1, \Delta C_2, \ldots, \Delta C_{n-1}] \in \Delta C)$ obtained by subtracting two adjacent measured values in measured values $C_i([C_1, C_2, \ldots, C_n] \in C)$ of each analog $M_i([M_1, M_2, \ldots, M_n] \in M)$ in the to-be-monitored analog measurement point set M, and the time difference $\Delta T_i([\Delta T_1, \Delta T_2, \ldots, \Delta T_{n-1}] \in \Delta T)$, n is a record number of the switching value signal set K with a serial number and a state, which are set in sequence, included in the content recorded in the time sequence event record table, and i denotes a switching value set in an $i^{th}$ time sequence event record table.

In the method, the switching value signal includes at least three contents, which are a time record accurate to millisecond, a state record and equipment description; the state record includes at least a state record representing a state of "1" and a state record representing a state of "0".

In the method, the historical scatter record table is measured value distribution statistics and measured value slope distribution statistics of the analog measurement point corresponding to the switching value signal set K under a relative process step in a normal start-up record of the working condition of the unit in the past half year, wherein the measured value distribution statistics of the analog measurement point under the relative process step is measured value distribution statistics $TC_i([TC_1, TC_2, \ldots, TC_n] \in TC)$ of the analog measurement point and measured value slope distribution statistics $TX_i([TX_1, TX_2, \ldots, TX_{n-1}] \in TX)$ of the measurement point corresponding to the time records $T_i([T_1, T_2, \ldots, T_n] \in T)$ of each switching value $K_i([K_1, K_2, \ldots, K_n] \in K)$ in the switching value signal set K; the measured value distribution statistics $TC_i$ of the analog measurement point is histogram statistics with measured values CL of the analog measurement point at moments corresponding to the switching value $K_i$ on a horizontal axis and distribution on a vertical axis; and the measured value slope of the analog measurement point distribution statistics $TX_i$ is histogram statistics with measured value slope of the analog measurement points XL at moments corresponding to the switching value $K_i$ on a horizontal axis and distribution on a vertical axis.

In the method, the measured value distribution statistics and the measured value slope distribution statistics of the analog measurement point under the relative process step are obtained through the following steps:

(6.1) traversing switching value records in a statistical cycle, taking out switching value signals simultaneously satisfying the switching value signal set K in sequence, and storing the time of the switching value signals taken out in a time sequence TL according to the sequence of the switching value signal set K;

(6.2) traversing analog records of the analog measurement point ID set M in the statistical cycle, and taking out measured values of the measurement point of the analog measurement point set M with a time scale of the time sequence TL to obtain a set CL and the measured value slope XL of the measurement point; and (6.3) obtaining the measured value distribution statistics $TC_i$ with the measured values CL of the analog measurement point at moments corresponding to the switching value $K_i$ on the horizontal axis and measured value distribution of the analog measurement point on the vertical axis; and obtaining the measured value slope of the analog measurement point distribution statistics $TX_i$ with the measured value slope of the analog measurement points XL at moments corresponding to the switching value $K_i$ on the horizontal axis and measured value slope of the analog measurement point distribution on the vertical axis.

In the method, calculating an abnormal state estimated value P based on the history scatter point distribution record, the analog measurement point first-level alarm value and the measured value slope of the analog measurement point includes the following steps:

(7.1) setting the abnormal state estimated value P to 0%, and when the measured value of the analog measurement point is greater than the analog measurement point first-level alarm value, setting the abnormal state estimated value P to 100%, and pre-warning the watchman that the measured value of the measurement point is higher than an upper limit; when the measured value of the analog measurement point is not greater than the analog measurement point first-level alarm value and the measured value $C_i$ of the analog measurement point corresponding to the switching value $K_i$ is outside a positive direction of a 1.96 times mean square error $\sigma c$ centered on an average value $c_{avi}$ of the measured value histogram statistics $TC_i$, of the analog measurement point that is, the measured value slope of the analog measurement point $X_i$ is greater than $(c_{avi}+1.96\ \sigma c)$, assigning the abnormal state estimated value P to 50%, and performing step (7.2); when the measured value of the analog measurement point is not greater than the analog measurement point first-level alarm value and the measured value $C_i$ of the analog measurement point corresponding to the switching value $K_i$ is not outside the positive direction of the 1.96 times mean square error $\sigma c$ centered on the average value $c_{avi}$ of the measured value histogram statistics $TC_i$ of the analog measurement point, that is, the measured value slope of the analog measurement point X, is not greater than $(c_{avi}+1.96\ \sigma c)$, $\sigma c$ being a measured value standard deviation, assigning the abnormal state estimated value P to 40%, and performing step (7.2);

(7.2) when the measured value slope of the analog measurement point $X_i$ corresponding to the switching value $K_i$ is outside a positive direction of a 1.96 times mean square error $\sigma x$ centered on an average value $x_{avi}$ of the measured value slope of the analog measurement point histogram statistics $TX_i$, that is, the measured value slope of the analog measurement point $X_i$ is greater than $(x_{avi}+1.96\sigma x)$, performing step (7.3); when the measured value slope of the analog measurement point $X_i$ corresponding to the switching value $K_i$ is outside a negative direction of the 1.96 times mean square error $\sigma x$ centered on the average value $x_{avi}$ of the measured value slope of the analog measurement point histogram statistics $TX_i$, that is, the measured value slope of the analog measurement point $X_i$ is less than $(x_{avi}-1.96\sigma x$, $\sigma x$ being a measured value slope standard deviation, and performing step (7.4); and otherwise, the abnormal state estimated value P being 0%, and not pre-warning the watchman;

(7.3) pre-warning the watchman that the measured value of the measurement point is at a risk of being higher than the upper limit, comparing previous switching values $K_t$ ($0<t\leq i$, t is a positive integer) to judge a number of times e (e=i–t, e is a positive integer) of continuous occurrence of the pre-warning that the measured value of the measurement point is at a risk of being higher than the upper limit, the abnormal state estimated value P being P+e×10%, i=i+1, and performing step (7.1); and (7.4) pre-warning the watchman that a start-up process step has a risk of timeout, comparing previous switching values $K_t$ ($0<t\leq i$, t is a positive integer) to judge a number of times q (q=i–t, q is a positive integer) of continuous occurrence of the pre-warning that the start-up process step has a risk of timeout, the abnormal state estimated value P being P+q×10%, i=i+1, and performing step (7.1).

In the method, a threshold $\delta$ of the abnormal state estimated value P is 50%.

In the method, the preventive operation performed by the watchman includes:

(9.1) confirming, on an upper computer of a monitoring system, whether the pre-warning is correct;

(9.2) reporting to an upper-level dispatching watchman; and (9.3) informing a watchman of a current plant.

In the method, the confirming, on an upper computer of a monitoring system, whether the pre-warning is correct includes checking whether the unit is in a start-up state, and/or calling out a simulation diagram to check whether an analog measured value is too high;

the reporting to an upper-level dispatching watchman includes reporting that a current start-up unit has a start-up failure risk, and/or applying for recovering a unit control right; and the informing a watchman of the station includes informing the watchman of an abnormal condition, and/or informing the watchman to go to the site for dealing with the abnormal in advance.

Compared with the prior art, the present disclosure fills the blank of the engineering field and has the following beneficial effects.

(1) The present disclosure provides a standardized analysis method for estimating a working condition start-up state of a unit in super real-time based on time sequence actions, analog measured values and historical statistics, which may realize faster-than-real-time monitoring based on historical and real-time switching value signals and measured values of the analog measurement point in an automatic detection and control manner through a computer, to provide an effective method for identifying hidden defects such as abnormal rising of the measured values and timeout of a start-up process step.

(2) The present disclosure may not only avoid occurrence and escalation of accidents (events), but also win precious pre-control time for risk control and effective disposal. The present disclosure provides a standardization method for forming, based on historical analog signals and switching value signals in a start-up record of the working condition of the unit in the past half year, historical histogram distribution statistics which takes switching value signals and analog measurement points as statistical objects and statistical distribution as metrics, so as to realize decoupling of a start-up pre-warning threshold from distribution statistics and provide a self-adaption historical statistical basis for real-time online estimation.

(3) The present disclosure provides a calculation method and an evaluation method for the slope of the measured value of the analog measurement point based on the switching value signal under a relative process step, so that the two research work of identifying the abnormal rising trend through the measured value and identifying timeout of a start-up process step through a step duration are unified into slope research, which provides effective evaluation indexes for estimating the working condition start-up state of the unit in super real-time.

(4) The present disclosure proposes, in combination with engineering experience, acquiring historical and current analog signal data and switching value signal data from a monitoring system, performing state estimation based on time sequence actions, analog measured values and historical statistics, grasping a change trend of historical and real-time performance of operating equipment, and predicting a change trend of the analog signal data of the monitoring system in advance, so that a watchman can give a pre-warning prior to an accident (event).

(5) In the present disclosure, characteristics of monitoring signals are fully taken into account, and related analysis methods are standardized, which are automatically completed by a computer, thereby providing reliable technical guarantee for safe production of the power plant.

BRIEF DESCRIPTION OF THE DRAWINGS

FIG. 1 is a flowchart of a method for self-adaption faster-than-real-time working condition start-up state prediction and estimation of a unit according to an embodiment of the present disclosure.

DETAILED DESCRIPTION OF THE EMBODIMENTS

Specific implementations of the present disclosure are further described below with reference to the accompanying drawings and examples, but implementation and protection of the present disclosure are not limited thereto. It is to be noted that if any of the following processes is not described in detail, they may be realized or understood by those skilled in the art with reference to the prior art.

The following is an example analysis on monitoring signals for start-up process of a power generation working condition of a #4 unit in Guangzhou Energy Storage Hydropower Plant from 11:00 to 19:00 on Apr. 10, 2019. In this example, the unit refers to a generating unit, and more specifically refers to a pumped storage power unit.

With reference to the flowchart in FIG. 1, a method for self-adaption faster-than-real-time working condition start-up state prediction and estimation of a unit includes the following steps.

(1.1) An event recording sequence, an analog measurement point ID, an analog measurement point first-level alarm value and a history scatter point distribution record are read from a time sequence event record table (Table 1 below), an analog measurement point table (Table 2 below), an alarm threshold table (Table 3 below) and a historical scatter record table (Table 4 below).

Content recorded in the time sequence event record table includes a switching value signal set K with a serial number and a state which are set in sequence; the switching value signal set K includes at least a unit start-up command signal and a unit steady-state signal; content recorded in the analog measurement point table includes a to-be-monitored analog measurement point set M; content recorded in the alarm threshold table includes an analog measurement point first-level alarm set $B_1$ and an analog measurement point second-level alarm set $B_2$; and content recorded in the historical scatter record table includes measured value distribution statistics and measured value slope distribution statistics of the analog measurement point corresponding to the switching value signal set K under a relative process step. The step refers to a signal node between flag bit signals of process steps in a working condition start-up process of the unit, or a signal node between a process step program and equipment action feedback in the working condition start-up process of the unit. The switching value signal includes at least three contents, which are a time record accurate to millisecond, a state record and equipment description respectively; the state record includes at least a state record representing a state of "1" and a state record representing a state of "0".

The measured value distribution statistics of the analog measurement point under the relative process step is measured value distribution statistics $TC_i([TC_1, TC_2, \ldots, TC_n] \in TC)$ of the analog measurement point and measured value slope distribution statistics $TX_i([TX_1, TX_2, \ldots, TX_{n-1}] \in TX)$ of the measurement point corresponding to the time records $T_i([T_1, T_2, \ldots, T_n] \in \Delta T)$ of each switching value $K_i([K_1, K_2, \ldots, K_n] \in K)$ in the switching value signal set K; n is the number of records of the switching value signal set K with the serial number and the state set in the sequential order of the contents recorded in the time sequence event record table, and i represents the switching amount set in the i-th time sequence event record table; the measured value distribution statistics $TC_i$ of the analog measurement point is histogram statistics with measured values CL of the analog measurement point at moments corresponding to the switching value $K_i$ on a horizontal axis and distribution on a vertical axis; and the measured value slope of the analog measurement point distribution statistics $TX_i$ is histogram statistics with measured value slope of the analog measurement points XL at moments corresponding to the switching value $K_i$ on a horizontal axis and distribution on a vertical axis.

The measured value distribution statistics and the measured value slope distribution statistics of the analog measurement point are specifically obtained from the following steps.

In step a, switching value records in a statistical cycle are traversed, switching value signals simultaneously satisfying the switching value signal set K in sequence are taken out, and the time of the switching value signals taken out is stored in a time sequence TL according to the sequence of the switching value signal set K. In the present embodiment, the statistical cycle is the past half year.

In step b, analog records of the analog measurement point set M in the statistical cycle are traversed, and measured values of the measurement point of the analog measurement point set M with a time scale of the time sequence TL are taken out to obtain a set CL and the measured value slope XL of the measurement point.

In step c, the measured value distribution statistics $TC_i$ of the analog measurement point with the measured values CL of the analog measurement point at moments corresponding to the switching value $K_i$ on the horizontal axis and measured value distribution of the analog measurement point on the vertical axis is obtained; and the measured value slope of the analog measurement point distribution statistics $TX_i$ with the measured value slope of the analog measurement points XL at moments corresponding to the switching value $K_i$ on the horizontal axis and measured value slope of the analog measurement point distribution on the vertical axis is obtained.

TABLE 1

Time sequence event record table

| Serial number | Switching value signal | Description 1 | Description 2 | Event state | Notes |
|---|---|---|---|---|---|
| 1 | $K_1$ | 04GTATEA0301 | GENERATOR REQUESTED STATUS | NO DETEC -> DETECTED | Power generation unit working condition start-up signal |
| 2 | $K_2$ | 04GTA_RV15_ | UNIT SPEED <0.034 VN | DETECTED -> NO DETEC | The unit starts to rotate |
| 3 | $K_3$ | 04GTA454XR_ | UNIT SPEED >0.5VN | NO DETEC -> DETECTED | The unit reaches a rotation speed of 50% |
| 4 | $K_4$ | 04GTA_RV18_ | UNIT SPEED >0.9 VN | NO DETEC -> DETECTED | The unit reaches a rotation speed of 90% |
| 5 | $K_5$ | 04GTA001JD_C | 04GTA001JD CLOSED | NO CLOSE -> CLOSED | An outlet switch of the unit is closed |
| 6 | $K_6$ | 04GTATEA1469 | GENERATOR STABLE STATUS | NO DETEC -> DETECTED | Power generation unit working condition steady-state signal |

TABLE 2

Analog measurement point table

| Analog signal | Analog measurement point ID | Analog measurement point short name | Description |
|---|---|---|---|
| $M_1$ | 3088226 | 04GTASMS4 | Upper guide bearing metal temperature 7 of Unit 4_SMS4_ in Guangzhou Energy Storage Hydropower Plant A |

TABLE 3

Alarm threshold table

| Serial number | Analog measurement point short name | First-level alarm value $B_1$ | Second-level alarm value $B_2$ |
|---|---|---|---|
| 1 | 04GTASMS4 | 75° C. | 80° C. |

TABLE 4

History scatter point distribution record

| Serial number | Switching value signal | Analog measurement point | Mean of measured value distribution $c_{avi}/°C$. | Negative 1.96 times standard deviation of measured value ($c_{avi}$ − 1.96σc) | Positive 1.96 times standard deviation of measured value ($c_{avi}$ + 1.96σc) | Mean of slope distribution $x_{avi}$ | Negative 1.96 times standard deviation of slope ($x_{avi}$ − 1.96σx) | Positive 1.96 times standard deviation of slope ($x_{avi}$ + 1.96σx) |
|---|---|---|---|---|---|---|---|---|
| 1 | $K_1$ | $M_1$ | 48.26 | 40.40 | 56.13 | | | |
| 2 | $K_2$ | $M_1$ | 49.50 | 41.43 | 57.57 | 0.00952 | 0.00797 | 0.01107 |
| 3 | $K_3$ | $M_1$ | 50.29 | 42.09 | 58.48 | 0.04632 | 0.03877 | 0.05387 |
| 4 | $K_4$ | $M_1$ | 50.74 | 42.47 | 59.01 | 0.03750 | 0.03139 | 0.04361 |
| 5 | $K_5$ | $M_1$ | 52.31 | 43.79 | 60.84 | 0.02582 | 0.02161 | 0.03003 |
| 6 | $K_6$ | $M_1$ | 52.34 | 43.78 | 60.90 | 0.00500 | 0 | 0.01233 |

(1.2) An measured value slope of the analog measurement point is calculated according to an event recording relative time.

The event recording relative time is a time difference $\Delta T_i([\Delta T_1, \Delta T_2, \ldots, \Delta T_{n-1}] \in \Delta T)$ obtained by subtracting two adjacent time records in time records $T_i([T_1, T_2, \ldots, T_n] \in T)$ of each switching value $K_i([K_1, K_2, \ldots, K_n] \in K)$ in the switching value signal set K; and the measured value slope of the analog measurement point $X_i([X_1, X_2, \ldots, X_n] \in X)$ is a quotient of a measured value difference $\Delta C_i$ ($[\Delta C_1, \Delta C_2, \ldots, \Delta C_{n-1}] \in \Delta C$) obtained by subtracting two adjacent measured values in measured values $C_i([C_1, C_2, \ldots, C_n] \in C)$ of each analog $M_i([M_1, M_2, \ldots, M_n] \in M)$ in the to-be-monitored analog measurement point set M, and the time difference $\Delta T_i([\Delta T_1, \Delta T_2, \ldots, \Delta T_{n-1}] \in \Delta T)$, n is a record number of the switching value signal set K with a serial number and a state, which are set in sequence, included in the content recorded in the time sequence event record table, and i denotes a switching value set in an $i^{th}$ time sequence event record table. Calculation results are shown in Table 5 below.

TABLE 5

| Serial number | Moment | Switching value signal $K_i$ | Measured value $C_i/°C$. | Measured value difference $\Delta C_i/°C$. | Time difference $\Delta T_i/s$ | Slope $X_i$ $\Delta C_i/\Delta T_i$ |
|---|---|---|---|---|---|---|
| 1 | 2019-04-10 11:13:22 130 | $K_1$ | 57.92 | / | / | / |
| 2 | 2019-04-10 11:15:32 AM 120 | $K_2$ | 59.40 | 1.48 | 130 s | 0.0114 |
| 3 | 2019-04-10 11:15:49 AM 000 | $K_3$ | 60.35 | 0.95 | 17 s | 0.0559 |
| 4 | 2019-04-10 11:16:01 AM 140 | $K_4$ | 60.88 | 0.53 | 12 s | 0.0442 |
| 5 | 2019-04-10 11:17:01 AM 720 | $K_5$ | 62.77 | 1.89 | 61 s | 0.0310 |
| 6 | 2019-04-10 11:17:06 AM 740 | $K_6$ | 62.84 | 0.07 | 5 s | 0.0140 |

(1.3) An abnormal state estimated value P is calculated based on the history scatter point distribution record, the analog measurement point first-level alarm value and the measured value slope of the analog measurement point.

Specific steps of obtaining the abnormal state estimated value P are as follows.

(7.1) The abnormal state estimated value P is set to 0%, and when the measured value of the analog measurement point is greater than the analog measurement point first-level alarm value, the abnormal state estimated value P is set to 100%, and the watchman is pre-warned that the measured value of the measurement point is higher than an upper limit; when the measured value of the analog measurement point is not greater than the analog measurement point first-level alarm value and the measured value $C_i$ of the analog measurement point corresponding to the switching value $K_i$ is outside a positive direction of a 1.96 times mean square error σc centered on an average value $c_{avi}$ of the measured value histogram statistics $TC_i$ of the analog measurement point, that is, the measured value slope of the analog measurement point $X_i$ is greater than ($c_{avi}$+1.96σc), the abnormal state estimated value P is assigned to 50%, and step (7.2) is performed; when the measured value of the analog measurement point is not greater than the analog measurement point first-level alarm value and the measured value $C_i$ of the analog measurement point corresponding to the switching value $K_i$ is not outside the positive direction of the 1.96 times mean square error σc centered on the average value $c_{avi}$ of the measured value histogram statistics $TC_i$ of the analog measurement point, that is, the measured value slope of the analog measurement point $X_i$ is not greater than ($c_{avi}$+1.96σc), σc is a measured value standard deviation, the abnormal state estimated value P is assigned to 40%, and step (7.2) is performed.

(7.2) When the measured value slope of the analog measurement point $X_i$ corresponding to the switching value $K_i$ is outside a positive direction of a 1.96 times mean square error σx centered on an average value $x_{avi}$ of the measured value slope of the analog measurement point histogram statistics $TX_i$, that is, the measured value slope of the analog measurement point $X_i$ is greater than ($x_{avi}$+1.96σx), step (7.3) is performed; when the measured value slope of the analog measurement point $X_i$ corresponding to the switching value $K_i$ is outside a negative direction of the 1.96 times mean square error σx centered on the average value $x_{avi}$ of the measured value slope of the analog measurement point histogram statistics $TX_i$, that is, the measured value slope of the analog measurement point $X_i$ is less than ($x_{avi}$−1.96σx), σx is a measured value slope standard deviation, and step (7.4) is performed; and otherwise, the abnormal state estimated value P is set to 0%, and the watchman is not pre-warned.

(7.3) The watchman is pre-warned that the measured value of the measurement point is at a risk of being higher than the upper limit, previous switching values $K_t$ ($0<t\leq i$, t is a positive integer) are compared to judge a number of times e (e=i–t, e is a positive integer) of continuous occurrence of the pre-warning that the measured value of the measurement point is at a risk of being higher than the upper limit, the abnormal state estimated value P is P+e×10%, i=i+1, and step (7.1) is performed.

(7.4) The watchman is pre-warned that a starting process step has a risk of timeout (the process step refers to a program step between the start of a program block flag bit and the end of a program block flag bit in the starting process of the unit), previous switching values $K_t$ ($0<t\leq i$, t is a positive integer) are compared to judge a number of times q (q=i–t, q is a positive integer) of continuous occurrence of the pre-warning that the starting process step has a risk of timeout, the abnormal state estimated value P is P+q×10%, 1=1+1, and step (7.1) is performed.

Calculation results finally obtained are shown in Table 6 below.

TABLE 6

| Moment | Measured value/° C. | Slope | State evaluated value P |
|---|---|---|---|
| 2019-04-10 11:13:22 130 | 57.92 | | |
| 2019-04-10 11:15:32 AM 120 | 59.4 | 0.0114 | 50% |
| 2019-04-10 11:15:49 AM 000 | 60.35 | 0.0559 | 60% |
| 2019-04-10 11:16:01 AM 140 | 60.88 | 0.0442 | 70% |
| 2019-04-10 11:17:01 AM 720 | 62.77 | 0.0310 | 80% |
| 2019-04-10 11:17:06 AM 740 | 62.84 | 0.0140 | 90% |

(1.4) No pre-warning is sent when the abnormal state estimated value P is below a threshold; and a pre-warning is sent to remind a watchman to perform a preventive operation when the abnormal state estimated value P is above the threshold. In the present embodiment, the threshold is 50%; that is, the abnormal state estimated value P is above 50%, and a pre-warning is sent to remind the watchman to perform a preventive operation.

In the present embodiment, the preventive operation performed by the watchman includes:

(1) confirming, on an upper computer of a monitoring system, whether the pre-warning is correct:

checking whether the unit is in a start-up state; and calling out simulation diagrams to check whether an analog measured value is too high;

(2) reporting to an upper-level dispatching watchman:

reporting that a current starting unit has a risk of starting failure;

applying for recovering a right for controlling the unit; and applying for, if a standby unit exists in the plant, starting the standby unit for machine replacement; and (3) informing a watchman of the current plant:

informing the watchman of an abnormal condition; and informing the watchman to go to the site for dealing with it in advance.

CONCLUSION

Thus, the present disclosure provides a standardized analysis method for estimating a working condition start-up state of a unit in super real-time based on time sequence actions, analog measured values and historical statistics, which may realize, when the analog measurement point of the unit has not reached the first-level alarm value 75° C., faster-than-real-time monitoring based on historical and real-time switching value signals and measured values of the analog measurement point in an automatic detection and control manner through a computer, to provide an effective method for identifying hidden defects such as abnormal rising of the measured values and timeout of a start-up process step, so that the watchman can perform a preventive operation in advance prior to an accident (event), precious dealing time is won for the watchman, and losses and influence caused by the accident (event) are reduced.

What is claimed is:

1. A method for predicting and estimating a working condition start-up state of a unit, comprising the following steps:

(1.1) reading an event recording sequence, an analog measurement point ID, an analog measurement point first-level alarm value and a history scatter point distribution record;

(1.2) calculating a measured value slope of an analog measurement point according to an event recording relative time;

(1.3) calculating an abnormal state estimated value P based on the history scatter point distribution record, the analog measurement point first-level alarm value and the measured value slope of the analog measurement point; and (1.4) sending no pre-warning when the abnormal state estimated value P is below a threshold; and sending a pre-warning to remind a watchman to perform a preventive operation when the abnormal state estimated value P is above the threshold;

wherein the event recording sequence, the analog measurement point ID, the analog measurement point first-level alarm value and the history scatter point distribution record are respectively read from a time sequence event record table, an analog measurement point table, an alarm threshold table and a historical scatter record table correspondingly, and content recorded in the time sequence event record table comprises a switching value signal set K with a serial number and a state which are set in sequence, the switching value signal set K comprising at least a unit start-up command signal and a unit steady-state signal; content recorded in the analog measurement point table comprises a to-be-monitored analog measurement point set M; content recorded in the alarm threshold table comprises an analog measurement point first-level alarm set $B_1$; and content recorded in the historical scatter record table comprises measured value distribution statistics and measured value slope distribution statistics of the analog measurement point corresponding to the switching value signal set K under a relative process step.

2. The method for predicting and estimating a working condition start-up state of a unit according to claim 1, wherein the event recording relative time in step (1.2) is a time difference $\Delta T_i$ ($[\Delta T_1, \Delta T_2, \ldots, \Delta T_{n-1}] \in \Delta T$) obtained by subtracting two adjacent time records in time records $T_i$ ($[T_1, T_2, \ldots, T_n] \in T$) of each switching value $K_i$ ($[K_1, K_2, \ldots, K_n] \in K$) in the switching value signal set K; and the measured value slope $X_i$ ($[X_1, X_2, \ldots, X_n] \in X$) of the analog measurement point is a quotient of a measured value difference $\Delta C_i$ ($[\Delta C_1, \Delta C_2, \ldots, \Delta C_{n-1}] \in \Delta C$) obtained by subtracting two adjacent measured values in measured values $C_i$ ($[C_1, C_2, \ldots, C_n] \in C$) of each analog $M_i$ ($[M_1, M_2, \ldots, M_n] \in M$) in the to-be-monitored analog measurement point set M, and the time difference $\Delta T_i$ ($[\Delta T_1, \Delta T_2, \ldots, \Delta T_{n-1}] \in \Delta T$), n is a record number of the switching value signal set K with a serial number and a state, which are set in sequence, comprised in the content recorded in the time sequence event record table, and i denotes a switching value set in an $i^{th}$ time sequence event record table.

3. The method for predicting and estimating a working condition start-up state of a unit according to claim 1, wherein the switching value signal comprises at least three contents, which are a time record accurate to millisecond, a state record and equipment description; the state record comprises at least a state record representing a state of "1" and a state record representing a state of "0".

4. The method for predicting and estimating a working condition start-up state of a unit according to claim 1, wherein the measured value distribution statistics of the analog measurement point under the relative process step is measured value distribution statistics $TC_i$ ($[TC_1, TC_2, \ldots, TC_n] \in TC$) of the analog measurement point and measured value slope distribution statistics $TX_i$ ($[TX_1, TX_2, \ldots, TX_{n-1}] \in TX$) of the analog measurement point corresponding to the time records $T_i$ ($[T_1, T_2, \ldots, T_n] \in T$) of each switching value $K_i$ ($[K_1, K_2, \ldots, K_n] \in K$) in the switching value signal set K;

the measured value distribution statistics $TC_i$ of the analog measurement point is histogram statistics with measured values CL of the analog measurement point at moments corresponding to the switching value $K_i$ on a horizontal axis and distribution on a vertical axis; and the measured value slope of the analog measurement point distribution statistics $TX_i$ is histogram statistics with measured value slope of the analog measurement points XL at moments corresponding to the switching value $K_i$ on a horizontal axis and distribution on a vertical axis.

5. The method for predicting and estimating a working condition start-up state of a unit according to claim 4, wherein the measured value distribution statistics and the measured value slope distribution statistics of the analog measurement point under the relative process step are obtained through the following steps:

(6.1) traversing switching value records in a statistical cycle, taking out switching value signals simultaneously satisfying the switching value signal set K in sequence, and storing the time of the switching value signals taken out in a time sequence TL according to the sequence of the switching value signal set K;

(6.2) traversing analog records of the analog measurement point set M in the statistical cycle, and taking out measured values of the analog measurement point of the analog measurement point set M with a time scale of the time sequence TL to obtain a set of the measured values CL of the analog measurement point and the measured value slope XL of the analog measurement point; and (6.3) obtaining the measured value distribution statistics $TC_i$ with the measured values CL of the analog measurement point at moments corresponding to the switching value $K_i$ on the horizontal axis and measured value distribution of the analog measurement point on the vertical axis; and obtaining the measured value slope of the analog measurement point distribution statistics $TX_i$ with the measured value slope of the analog measurement points XL at moments corresponding to the switching value $K_i$ on the horizontal axis and measured value slope of the analog measurement point distribution on the vertical axis.

6. The method for predicting and estimating a working condition start-up state of a unit according to claim 1, wherein step (1.3) of calculating an abnormal state estimated value P based on the history scatter point distribution record, the analog measurement point first-level alarm value and the measured value slope of the analog measurement point comprises the following steps:

(7.1) setting the abnormal state estimated value P to 0%, and when the measured value of the analog measurement point is greater than the analog measurement point first-level alarm value, setting the abnormal state estimated value P to 100%, and pre-warning the watchman that the measured value of the analog measurement point is higher than an upper limit; when the measured value of the analog measurement point is not greater than the analog measurement point first-level alarm value and the measured value $C_i$ of the analog measurement point corresponding to the switching value $K_i$ is outside a positive direction of a 1.96 times mean square error σc centered on an average value $c_{avi}$ of the measured value histogram statistics $TC_i$ of the analog measurement point, that is, the measured value slope of the analog measurement point $X_i$ is greater than ($c_{avi}$+1.96σc), assigning the abnormal state estimated value P to 50%, and performing step (7.2); when the measured value of the analog measurement point is not greater than the analog measurement point first-level alarm value and the measured value $C_i$ of the analog measurement point corresponding to the switching value $K_i$ is not outside the positive direction of the 1.96 times mean square error σc centered on the average value $c_{avi}$ of the measured value histogram statistics $TC_i$ of the analog measurement point, that is, the measured value slope of the analog measurement point $X_i$ is no greater than ($c_{avi}$+1.96σc), σc being a measured value standard deviation, assigning the abnormal state estimated value P to 40%, and performing step (7.2);

(7.2) when the measured value slope of the analog measurement point $X_i$ corresponding to the switching value $K_i$ is outside a positive direction of a 1.96 times mean square error σx centered on an average value $x_{avi}$ of the measured value slope of the analog measurement point histogram statistics $TX_i$, that is, the measured value slope of the analog measurement point $X_i$ is greater than ($x_{avi}$+1.96σx), performing step (7.3); when the measured value slope of the analog measurement point $X_i$ corresponding to the switching value $K_i$ is outside a negative direction of the 1.96 times mean square error σx centered on the average value $x_{avi}$ of the measured value slope of the analog measurement point histogram statistics $TX_i$, that is, the measured value slope of the analog measurement point $X_i$ is less than ($x_{avi}$−1.96σx), σx being a measured value slope standard deviation, and performing step (7.4); and otherwise, the abnormal state estimated value P being 0%, and not pre-warning the watchman;

(7.3) pre-warning the watchman that the measured value of the analog measurement point is at a risk of being higher than the upper limit, comparing previous switching values $K_t$ (0<t≤i, t is a positive integer) to judge a number of times e (e=i−t, e is a positive integer) of continuous occurrence of the pre-warning that the measured value of the analog measurement point is at a risk of being higher than the upper limit, the abnormal state estimated value P being P+e×10%, i=i+1, and performing step (7.1); and (7.4) pre-warning the watchman that a start-up process step has a risk of timeout, comparing previous switching values $K_t$ (0<t≤i, t is a positive integer) to judge a number of times q (q=i−t, q is a positive integer) of continuous occurrence of the pre-warning that the start-up process step has a risk of timeout, the abnormal state estimated value P being P+q×10%, i=i+1, and performing step (7.1).

7. The method for predicting and estimating a working condition start-up state of a unit according to claim 1, wherein a threshold δ of the abnormal state estimated value P in step (1.4) is 50%.

8. The method for predicting and estimating a working condition start-up state of a unit according to claim 1, wherein the preventive operation performed by the watchman in step (1.4) comprises:

(9.1) confirming, on an upper computer of a monitoring system, whether the pre-warning is correct:

(9.2) reporting to a superior dispatching watchman; and (9.3) informing a watchman of a current plant.

9. The method for predicting and estimating a working condition start-up state of a unit according to claim 1, wherein the confirming, on an upper computer of a monitoring system, whether the pre-warning is correct comprises checking whether the unit is in a start-up state, and/or calling out a simulation diagram to check whether the measured value of the analog measurement point is higher than a second threshold;

the reporting to an upper-level dispatching watchman comprises reporting that a current start-up unit has a start-up failure risk, and/or applying for recovering a unit control right; and the informing a watchman of the station comprises informing the watchman of an abnormal condition, and/or informing the watchman to go to the site for dealing with the abnormal condition in advance.

\* \* \* \* \*